United States Patent
Lee et al.

(10) Patent No.: US 12,269,921 B2
(45) Date of Patent: Apr. 8, 2025

(54) POLYCARBONATE COPOLYMER, METHOD FOR PREPARING SAME, AND COMPOSITION COMPRISING SAME

(71) Applicant: HANWHA SOLUTIONS CORPORATION, Seoul (KR)

(72) Inventors: Jin Seo Lee, Seoul (KR); Do Kyoung Kim, Seoul (KR); Do Hyun Seo, Seoul (KR); Min Jae Jeong, Seoul (KR); Seung Hwan Moon, Seoul (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 0 days.

(21) Appl. No.: 18/894,159

(22) Filed: Sep. 24, 2024

(65) Prior Publication Data

US 2025/0019495 A1    Jan. 16, 2025

Related U.S. Application Data

(63) Continuation of application No. PCT/KR2023/003952, filed on Mar. 24, 2023.

(30) Foreign Application Priority Data

Mar. 25, 2022 (KR) ........................ 10-2022-0037040

(51) Int. Cl.
*C08G 64/16* (2006.01)
*C08G 64/30* (2006.01)

(52) U.S. Cl.
CPC ............. *C08G 64/16* (2013.01); *C08G 64/30* (2013.01); *C08G 64/302* (2013.01); *C08G 64/305* (2013.01)

(58) Field of Classification Search
USPC .......................................... 528/219
See application file for complete search history.

(56) References Cited

U.S. PATENT DOCUMENTS

| | | | | |
|---|---|---|---|---|
| 6,657,018 B1 * | 12/2003 | Hoover | ................ | C08G 77/448 524/588 |
| 8,940,836 B2 * | 1/2015 | Kwon | ................... | C08L 69/005 525/148 |

FOREIGN PATENT DOCUMENTS

| | | |
|---|---|---|
| JP | 2009102536 A | 5/2009 |
| JP | 2017031346 A | 2/2017 |
| KR | 20140145160 A | 12/2014 |
| KR | 20220022714 A | 2/2022 |
| WO | 2010119574 A1 | 10/2010 |

* cited by examiner

*Primary Examiner* — Terressa Boykin
(74) *Attorney, Agent, or Firm* — Harvest IP Law, LLP

(57) ABSTRACT

The polycarbonate copolymer of the present invention comprises: a unit derived from at least one type of primary dihydroxyl compound; and a unit derived from at least two types of secondary dihydroxyl compounds, wherein the polycarbonate copolymer has a pencil hardness of H or greater, when a specimen is measured according to the pencil hardness test (ISO 15184), and a glass transition temperature (Tg) of about 90° C. to about 160° C., measured according to ISO 11357. The polycarbonate copolymer has excellent heat resistance, scratch resistance, moldability, light resistance, weather resistance, transparency, mechanical strength, and the like.

16 Claims, No Drawings

POLYCARBONATE COPOLYMER, METHOD FOR PREPARING SAME, AND COMPOSITION COMPRISING SAME

CROSS-REFERENCE TO RELATED APPLICATION(S)

This application is a National Stage of International Application No. PCT/KR2023/003952 filed on Mar. 24, 2023, claiming priority based on Korean Patent Application No. 10-2022-0037040 filed on Mar. 25, 2022, the disclosure of which is incorporated herein by reference in its entirety.

TECHNICAL FIELD

The present invention relates to a polycarbonate copolymer, a method of preparing the same, and a composition comprising the same. More specifically, the present invention relates to a polycarbonate copolymer having good properties in terms of heat resistance, scratch resistance, formability, light resistance, weather resistance, transparency, mechanical strength, and the like, a method of preparing the same, and a composition comprising the same.

BACKGROUND ART

Polycarbonate is a thermoplastic polymer containing carbonate ester (—COO—) as a repeating unit in a main chain. Existing polycarbonates are mainly prepared through the reaction of bisphenol-A (BPA) and phosgene ($COCl_2$). While these polycarbonates exhibit excellent heat resistance, impact resistance, and flame retardancy, light resistance, transmittance, and scratch resistance are relatively poor.

In addition, since existing polycarbonates have an aromatic ring as a repeating structure, yellowing occurs due to sunlight including ultraviolet rays, and thus the light transmittance in some wavelength ranges is lowered and a polymer chain is broken, so that it is difficult to apply in fields requiring weather resistance.

Meanwhile, when BPA as a monomer remains in polycarbonate, it is known to act as an endocrine disruptor in vivo. Therefore, various regulations are being strengthened for using existing polycarbonates as products in contact with the human body, such as baby products, or medical products.

In addition, phosgene gas is a highly toxic substance subject to environmental regulations, and storage and management is difficult, requiring a separate cooling device to store the gas.

Therefore, there is a demand for a polycarbonate that overcomes the above disadvantages of existing polycarbonates and has good properties in terms of heat resistance, scratch resistance, formability, light resistance, weather resistance, transparency, mechanical strength, and the like.

DISCLOSURE

Technical Problem

It is one aspect of the present invention to provide a polycarbonate copolymer having good properties in terms of heat resistance, scratch resistance, formability, light resistance, weather resistance, transparency, mechanical strength, and the like.

It is another object of the present invention to provide a method of preparing the polycarbonate copolymer.

It is a further aspect of the present invention to provide a composition comprising the polycarbonate copolymer.

The above and other objects of the present invention can be achieved by embodiments of the present invention described below.

Technical Solution

1. One aspect of the present invention relates to a polycarbonate copolymer. The polycarbonate copolymer is a polycarbonate copolymer including: a unit derived from at least one primary dihydroxyl compound; and units derived from at least two secondary dihydroxyl compounds, wherein the polycarbonate copolymer has a pencil hardness higher than H as measured according to a pencil hardness test (ISO 15184), and a glass transition temperature (Tg) of about 90 to about 160° C. as measured according to ISO 11357.

2. In the embodiment 1, the polycarbonate copolymer may include about 1 to about 30 mol % of a unit derived from a secondary dihydroxyl compound represented by Formula 4b, based on the units derived from an entire dihydroxyl:

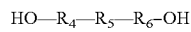 [Formula 4b]

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

3. In the embodiment 1 or 2, the polycarbonate copolymer may include about 5 to about 45 mol % of units derived from a primary dihydroxyl compound; about 45 to about 85 mol % of a unit derived from a secondary dihydroxyl compound represented by Formula 4a; and about 1 to about 30 mol % of a unit derived from a secondary dihydroxyl compound represented by Formula 4b, based on the units derived from an entire dihydroxyl:

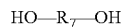 [Formula 4a]

in Formula 4a, $R_7$ is a substituted or unsubstituted cycloalkylene group having 4 to 20 carbon atoms or a substituted or unsubstituted cycloalkoxylene group having 4 to 20 carbon atoms;

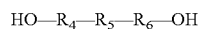 [Formula 4b]

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

4. One aspect of the present invention relates to a polycarbonate copolymer. The polycarbonate copolymer may include about 5 to about 95 mol % of at least one first repeating unit represented by Formula 1 below; and about 5 to about 95 mol % of at least two second repeating units represented by Formula 2 below:

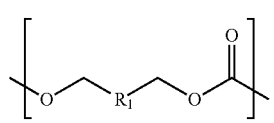

[Formula 1]

in Formula 1, $R_1$ is a single bond, a substituted or unsubstituted alkylene group having 1 to 20 carbon atoms, a substituted or unsubstituted alkoxylene group having 2 to 20 carbon atoms, a substituted or unsubstituted cycloalkylene group having 4 to 20 carbon atoms, or a substituted or unsubstituted cycloalkoxylene group having 4 to 20 carbon atoms;

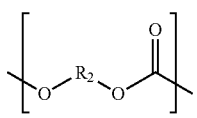
[Formula 2]

in Formula 2, $R_2$ is a substituted or unsubstituted cycloalkylene group having 4 to 20 carbon atoms or a substituted or unsubstituted cycloalkoxylene group having 4 to 20 carbon atoms.

5. In the embodiment 4, the polycarbonate copolymer may include about 5 to about 45 mol % of the first repeating unit; about 45 to about 85 mol % of a second repeating unit represented by Formula 2a below; and about 1 to about 30 mol % of a second repeating unit represented by Formula 2b below:

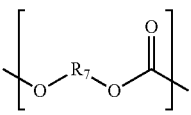
[Formula 2a]

in Formula 2a, $R_7$ is a substituted or unsubstituted cycloalkylene group having 4 to 20 carbon atoms or a substituted or unsubstituted cycloalkoxylene group having 4 to 20 carbon atoms;

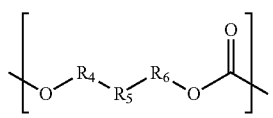
[Formula 2b]

in Formula 2b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

6. In the embodiment 4 or 5, the first repeating unit may be derived from a primary dihydroxyl compound including one or more of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol, tricyclodecane dimethanol, pentacyclopentadecane dimethanol, decalindimethanol, tricyclotetradecane dimethanol, norbornandimethanol, adamantane dimethanol, 3,9-bis(1,1-dimethyl-2-hydroxyethyl)-2,4,8,10-tetraoxaspiro[5.5]undecane, and bicyclo[2.2.2]octane-2,3-dimethanol, and at least one carbonate diester compound.

7. In any one of embodiments 4 to 6, the second repeating unit may be derived from a secondary dihydroxyl compound including two or more of 1,4:3,6-dianhydrohexitol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbonanediol, adamantanediol, 2,2-bis(4-hydroxycyclohexyl)propane, and 2,2,4,4-tetramethyl-1,3-cyclobutanediol, and at least one carbonate diester compound.

8. In any one of embodiments 4 to 7, the polycarbonate copolymer may further include a third repeating unit derived from at least one tertiary dihydroxyl compound and at least one carbonate diester compound.

9. In any one of embodiments 4 to 8, the polycarbonate copolymer may have a pencil hardness higher than H as measured according to a pencil hardness test (ISO 15184); and may have a glass transition temperature (Tg) of about 90 to about 160° C. at a transition point obtained when, in accordance with ISO 11357, 10 mg of the sample is maintained at 220° C. for 1 minute at a heating rate of 10° C. per minute and then cooled down at a cooling rate of 10° C. per minute, and the temperature is raised to 220° C. at the same heating rate.

10. In any one of embodiments 4 to 9, a solution in which 0.5 g of the sample is dissolved in a mixed solvent of 14.5 g of hexafluoroisopropanol and dichloromethane may have a dynamic viscosity of about 8.5 to about 16 cps as measured using a Brookfield dynamic viscometer at 25° C.

11. Another aspect of the present invention relates to a method of preparing a polycarbonate copolymer. The preparation method includes melting a dihydroxyl compound including about 5 to about 95 mol % of at least one primary dihydroxyl compound represented by Formula 3 below and about 5 to about 95 mol % of at least two secondary dihydroxyl compounds represented by Formula 4 below, and at least one carbonate diester compound to obtain a melt; and performing polycondensation of the melt in the presence of a catalyst:

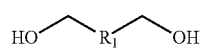
[Formula 3]

in Formula 3, $R_1$ is a single bond, a substituted or unsubstituted alkylene group having 1 to 20 carbon atoms, a substituted or unsubstituted alkoxylene group having 2 to 20 carbon atoms, a substituted or unsubstituted cycloalkylene group having 4 to 20 carbon atoms, or a substituted or unsubstituted cycloalkoxylene group having 4 to 20 carbon atoms;

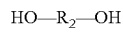
[Formula 4]

in Formula 4, $R_2$ is a substituted or unsubstituted cycloalkylene group having 4 to 20 carbon atoms or a substituted or unsubstituted cycloalkoxylene group having 4 to 20 carbon atoms.

12. In the embodiment 11, the dihydroxyl compound may include about 5 to about 45 mol % of the primary dihydroxyl compound; about 45 to about 85 mol % of a secondary dihydroxyl compound represented by Formula 4a; and about 1 to about 30 mol % of a secondary dihydroxyl compound represented by Formula 4b:

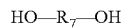
[Formula 4a]

in Formula 4a, $R_7$ is a substituted or unsubstituted cycloalkylene group having 4 to 20 carbon atoms or a substituted or unsubstituted cycloalkoxylene group having 4 to 20 carbon atoms;

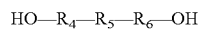
[Formula 4b]

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

13. In the embodiment 11 or 12, the dihydroxyl compound may further include at least one tertiary dihydroxyl compound, and the tertiary dihydroxyl compound may include one or more of 1,1'-bis(4-hydroxyphenyl)-3,3,5-trimethylcyclohexane, bis(4-hydroxyphenyl)cyclohexane, and bis(4-hydroxyphenyl)cyclopentane.

14. In any one of embodiments 11 to 13, the carbonate diester compound may include one or more of diphenyl carbonate, ditolyl carbonate, dimethyl carbonate, diethyl carbonate, and di-t-butyl carbonate.

15. Still another aspect of the invention relates to a composition comprising a polycarbonate copolymer. The composition includes the polycarbonate copolymer according to any one of the embodiments 1 to 10.

Advantageous Effects

The present invention provides a polycarbonate copolymer having good properties in terms of heat resistance, scratch resistance, formability, light resistance, weather resistance, transparency, mechanical strength, and the like, a method of preparing the same, and a composition comprising the same.

BEST MODE

Hereinafter, the present invention will be described in detail.

In the present specification, "a to b" representing a numerical range is defined as "≥a and ≤b."

Polycarbonate Copolymer

The polycarbonate copolymer according to one embodiment of the present invention is prepared from three or more types of dihydroxyl compound monomers having few or preferably no aromatic ring structures, double bonds, or triple bonds excluding bisphenol-A which hinders eco-friendliness.

The polycarbonate copolymer according to one embodiment of the present invention includes a unit derived from at least one primary dihydroxyl compound; and units derived from at least two secondary dihydroxyl compounds, wherein the polycarbonate copolymer may have a pencil hardness higher than H as measured according to a pencil hardness test (ISO 15184) and a glass transition temperature (Tg) of about 90 to about 160° C. as measured according to ISO 11357.

In an embodiment, the polycarbonate copolymer may include about 1 to about 30 mol % of a unit derived from a secondary dihydroxyl compound represented by Formula 4b, based on the units derived from an entire dihydroxyl.

  [Formula 4b]

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

In an embodiment, the polycarbonate copolymer may include about 5 to about 45 mol % of units derived from a primary dihydroxyl compound; about 45 to about 85 mol % of a unit derived from a secondary dihydroxyl compound represented by Formula 4a; and about 1 to about 30 mol % of a unit derived from a secondary dihydroxyl compound represented by Formula 4b, based on the units derived from an entire dihydroxyl.

  [Formula 4a]

in Formula 4a, $R_7$ is a substituted or unsubstituted cycloalkylene group having 4 to 20 carbon atoms or a substituted or unsubstituted cycloalkoxylene group having 4 to 20 carbon atoms;

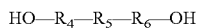  [Formula 4b]

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

In an embodiment, a molar ratio of the secondary dihydroxyl compound represented by Formula 4a and the secondary dihydroxyl compound represented by Formula 4b may be about 2:1 to about 8.5:1, for example about 5:1 to about 8.2:1, specifically about 6:1 to about 8:1.

In an embodiment, the primary dihydroxyl compound may be included in an amount of about 5 to about 45 mol %, for example about 8 to about 40 mol %, specifically about 10 to about 35 mol %, based on 100 mol % of an entire dihydroxyl compound.

In an embodiment, a molar ratio of the primary dihydroxyl compound (primary dihydroxyl compound represented by Formula 3 below) and the secondary dihydroxyl compound represented by Formula 4a may be about 1:1.2 to about 1:8.

In an embodiment, a content of the primary dihydroxyl compound (primary dihydroxyl compound represented by Formula 3 below) and the secondary dihydroxyl compound represented by Formula 4b may satisfy Expression 1 below.

Content of primary dihydroxyl compound≥Content of secondary dihydroxyl compound represented by Formula 4b   [Expression 1]

In addition, the polycarbonate copolymer according to one embodiment of the present invention may include at least one first repeating unit represented by Formula 1 below; and at least two second repeating units represented by Formula 2 below:

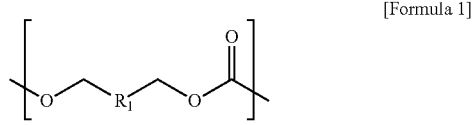  [Formula 1]

in Formula 1, $R_1$ is a single bond, a substituted or unsubstituted alkylene group having 1 to 20 carbon atoms, a substituted or unsubstituted alkoxylene group having 2 to 20 carbon atoms, a substituted or unsubstituted cycloalkylene group having 4 to 20 carbon atoms, or a substituted or unsubstituted cycloalkoxylene group having 4 to 20 carbon atoms.

  [Formula 2]

in Formula 2, $R_2$ is a substituted or unsubstituted cycloalkylene group having 4 to 20 carbon atoms or a substituted or unsubstituted cycloalkoxylene group having 4 to 20 carbon atoms.

Here, the "substitution" means that a hydrogen atom is substituted with an alkyl group having 1 to 10 carbon atoms, a halogen atom, a nitro group, a cyano group, a hydroxyl group, an amino group, a cycloalkyl group having 3 to 10 carbon atoms, a heterocycloalkyl group having 3 to 10 carbon atoms, or combinations thereof.

In addition, the "alkyl," "alkoxy" and other substituents including the "alkyl" moiety include both straight- or branched-chain forms, and the "cycloalkyl" includes all polycyclic ring structural forms such as a saturated monocyclic or saturated bicyclic having 4 to 20 carbon atoms.

In an embodiment, the polycarbonate copolymer may have about 5 to about 95 mol % of the first repeating unit and about 5 to about 95 mol % of the second repeating unit based on 100 mol % of an entire repeating unit. Within the above range, the polycarbonate copolymer may have excellent heat resistance, scratch resistance, formability, light resistance, weather resistance, transparency, mechanical strength, and the like.

In an embodiment, the polycarbonate copolymer may include about 5 to about 45 mol % of the first repeating unit; about 45 to about 85 mol % of a second repeating unit represented by Formula 2a below; and about 1 to about 30 mol % of a second repeating unit represented by Formula 2b below.

[Formula 2a]

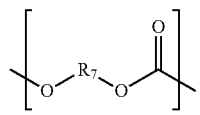

in Formula 2a, $R_7$ is a substituted or unsubstituted cycloalkylene group having 4 to 20 carbon atoms or a substituted or unsubstituted cycloalkoxylene group having 4 to 20 carbon atoms.

[Formula 2b]

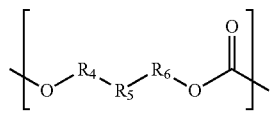

in Formula 2b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

In an embodiment, the first repeating unit may be derived from a primary dihydroxyl compound including one or more of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol, tricyclodecane dimethanol, pentacyclopentadecane dimethanol, decalindimethanol, tricyclotetradecane dimethanol, norbornandimethanol, adamantane dimethanol, 3,9-bis(1,1-dimethyl-2-hydroxyethyl)-2,4,8,10-tetraoxaspiro[5.5]undecane, and bicyclo[2.2.2]octane-2,3-dimethanol, and at least one carbonate diester compound, but is not limited thereto.

In an embodiment, the second repeating unit may be derived from a secondary dihydroxyl compound including two or more of 1,4:3,6-dianhydrohexitol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbonanediol, adamantanediol, 2,2-bis(4-hydroxycyclohexyl)propane, and 2,2,4,4-tetramethyl-1,3-cyclobutanediol, and at least one carbonate diester compound, but is not limited thereto.

In an embodiment, the secondary dihydroxyl compound may include 1,4:3,6-dianhydrohexitol, 2,2-bis(4-hydroxycyclohexyl)propane, and/or 2,2,4,4-tetramethyl-1,3-cyclobutanediol, and the like. Here, 1,4:3,6-dianhydrohexitol may be isomannide, isosorbide and/or isoidide, preferably isosorbide.

In an embodiment, the second repeating unit may include a repeating unit represented by Formula 2a and a repeating unit represented by Formula 2b, and a molar ratio of the repeating unit represented by Formula 2a and the repeating unit represented by Formula 2b is about 2:1 to about 8.5:1, for example, about 5:1 to about 8.2:1, specifically about 6:1 to about 8:1, but is not limited thereto.

In an embodiment, the polycarbonate copolymer may further include a third repeating unit derived from at least one tertiary dihydroxyl compound and at least one carbonate diester compound.

In an embodiment, the tertiary dihydroxyl compound may include 1,1'-bis(4-hydroxyphenyl)-3,3,5-trimethylcyclohexane, bis(4-hydroxyphenyl)cyclohexane, bis(4-hydroxyphenyl)cyclopentane, and combinations thereof.

In an embodiment, a content of the third repeating unit may be 0 to about 20 mol % based on 100 mol % of a total of the first repeating unit, the second repeating unit, and the third repeating unit. When the third repeating unit is included, the polycarbonate copolymer may have better heat resistance.

In an embodiment, the polycarbonate copolymer may have pencil hardness higher than H as measured according to a pencil hardness test (ISO 15184).

In an embodiment, the polycarbonate copolymer may have a glass transition temperature (Tg) of about 90 to about 160° C., for example about 100 to about 155° C. at a transition point obtained when, in accordance with ISO 11357, 10 mg of the sample is maintained at 220° C. for 1 minute at a temperature increase rate of 10° C. per minute and then cooled at a cooling rate of 10° C. per minute, and the temperature is raised to 220° C. at the same temperature increase rate.

In an embodiment, a solution in which 0.5 g of the sample is dissolved in a mixed solvent of 14.5 g of hexafluoroisopropanol and dichloromethane may have a dynamic viscosity of about 8.5 to about 16 cps, for example about 9 to about 12 cps as measured using a Brookfield dynamic viscometer at 25° C.

As described above, polycarbonate copolymers of the present invention are multicomponent copolymers obtained by necessarily copolymerizing the primary dihydroxyl compound and the secondary dihydroxyl compounds as the dihydroxyl compounds, wherein the polycarbonate copolymer can solve brittleness problem in the case of applying only secondary dihydroxyl compounds, and can improve heat resistance and scratch resistance at the same time.

Preparation Method of Polycarbonate Copolymer

Polycarbonate according to one embodiment of the present invention may be prepared by a preparation method including: (1) melting a dihydroxyl compound including about 5 to about 95 mol % of at least one primary dihydroxyl compound represented by Formula 3 below and about 5 to about 95 mol % of at least two secondary dihydroxyl compounds represented by Formula 4 below, and at least one carbonate diester compound to obtain a melt; and (2) performing polycondensation of the melt in the presence of a catalyst.

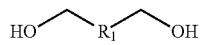 [Formula 3]

in Formula 3, $R_1$ is a single bond, a substituted or unsubstituted alkylene group having 1 to 20 carbon atoms, a substituted or unsubstituted alkoxylene group having 2 to 20 carbon atoms, a substituted or unsubstituted cycloalkylene group having 4 to 20 carbon atoms, or a substituted or unsubstituted cycloalkoxylene group having 4 to 20 carbon atoms;

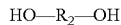 [Formula 4]

in Formula 4, $R_2$ is a substituted or unsubstituted cycloalkylene group having 4 to 20 carbon atoms or a substituted or unsubstituted cycloalkoxylene group having 4 to 20 carbon atoms.

Step (1)

In step (1), a dihydroxyl compound including at least one primary dihydroxyl compounds and at least two secondary dihydroxyl compounds; and at least one carbonate diester compound are melted.

In an embodiment, the dihydroxyl compound may include about 5 to about 45 mol % of the primary dihydroxyl compound; about 45 to about 85 mol % of a secondary dihydroxyl compound represented by Formula 4a; and about 1 to about 30 mol % of a secondary dihydroxyl compound represented by Formula 4b.

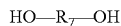 [Formula 4a]

in Formula 4a, $R_7$ is a substituted or unsubstituted cycloalkylene group having 4 to 20 carbon atoms or a substituted or unsubstituted cycloalkoxylene group having 4 to 20 carbon atoms;

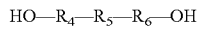 [Formula 4b]

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

In an embodiment, the dihydroxyl compound may further include the tertiary dihydroxyl compound in addition to the primary dihydroxyl compound and the secondary dihydroxyl compound.

In an embodiment, the carbonate diester compound may be a compound represented by Formula 5 below.

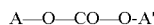 [Formula 5]

in Formula 5, A and A' are each independently a substituted or unsubstituted alkyl group having 1 to 18 carbon atoms or a substituted or unsubstituted aryl group having 1 to 18 carbon atoms.

In an embodiment, the carbonate diester compound may include one or more of diphenyl carbonate, ditolyl carbonate, dimethyl carbonate, diethyl carbonate, and di-t-butyl carbonate, but is not particularly limited thereto. Preferably, the carbonate diester compound may be diphenyl carbonate.

In an embodiment, a content of the carbonate diester compound may be about 0.9 to about 1.1 moles based on about 1 mole of the dihydroxyl compound. Within the above range, the polycarbonate copolymer may have excellent heat resistance, scratch resistance, formability, light resistance, weather resistance, transparency, mechanical strength, and the like.

In an embodiment, the above-mentioned compounds may be melted at a temperature of about 150 to about 250° C., but the temperature range is not particularly limited as long as these compounds can be sufficiently melted.

Step (2)

In the above step (2), the melt obtained in step (1) is subjected to polycondensation in the presence of a catalyst.

In an embodiment, the catalyst may include an alkali metal catalyst, an alkaline earth metal catalyst, or a mixture thereof.

In an embodiment, the alkali metal catalyst may include one or more of lithium hydroxide (LiOH), sodium hydroxide (NaOH), potassium hydroxide (KOH), cesium hydroxide (CsOH), lithium carbonate ($Li_2CO_3$), sodium carbonate ($Na_2CO_3$), potassium carbonate ($K_2CO_3$), cesium carbonate ($Cs_2CO_3$), lithium acetate (LiOAc), sodium acetate (NaOAc), potassium acetate (KOAc), and cesium acetate (CsOAc), but is not particularly limited thereto.

In an embodiment, the alkaline earth metal catalyst may include one or more of calcium hydroxide ($Ca(OH)_2$), barium hydroxide ($Ba(OH)_2$), magnesium hydroxide ($Mg(OH)_2$), strontium hydroxide ($Sr(OH)_2$), calcium carbonate ($CaCO_3$), barium carbonate ($BaCO_3$), magnesium carbonate ($MgCO_3$), strontium carbonate ($SrCO_3$), calcium acetate ($Ca(OAc)_2$), barium acetate ($Ba(OAc)_2$), magnesium acetate ($Mg(OAc)_2$), and strontium acetate ($Sr(OAc)_2$), but is not particularly limited thereto.

In an embodiment, a content of the catalyst may be about 50 to about 2,000 ppm based on about 1 mole of an entire dihydroxyl compound. Within the above range, the polycarbonate copolymer may have excellent heat resistance, scratch resistance, formability, light resistance, weather resistance, transparency, mechanical strength, and the like.

Meanwhile, the alkali metal and/or alkaline earth metal catalyst may be used together with a base catalyst such as base ammonium or amine, a base phosphorus, or base boron compound, and the base catalyst may be used alone or in combination, and an amount used is not particularly limited.

In addition, during melt polycondensation, additives such as an antioxidant and a heat stabilizer may be added, if necessary.

In an embodiment, examples of the antioxidant and the heat stabilizer may include hindered phenol, hydroquinone, phosphite, and substituted compounds thereof.

In an embodiment, the polycondensation may include (2-1) performing a primary reaction at a pressure of about 0.5 to about 5.0 bar and a temperature of about 150 to about 250° C. for about 0.5 to about 5.0 hours; and (2-2) performing a secondary reaction at a pressure of about 0.001 to about 0.5 bar and a temperature of about 190 to about 250° C. for about 0.5 to about 5.0 hours. After sufficiently reacting the dihydroxyl compound and the carbonate diester compound through the reaction in step 2-1, a conversion rate of monomers can be increased and copolymers having a higher molecular weight can be synthesized, by proceeding with the reaction in step 2-2. In particular, when an initial reaction temperature is high, it is preferable to perform the reaction in two steps because thermal decomposition of monomers and polymers may be accelerated.

Composition

The composition according to one embodiment of the present invention includes the polycarbonate copolymer. For example, it may be prepared as a composition further including additional resin components or additives in addition to the polycarbonate copolymer.

In an embodiment, the additive may include an antioxidant, a heat stabilizer, a light absorber, a color former, a lubricant, a colorant, a conductive agent, a nucleation agent, a flame retardant, a plasticizer, an antistatic agent, and combinations thereof, but is not limited thereto.

In an embodiment, the antioxidant and the heat stabilizer may be the same as or different from those described in the method of preparing the polycarbonate copolymer.

In an embodiment, resorcinol, salicylate, and the like may be used as a light absorber.

In an embodiment, phosphite, hydrophosphite, and the like may be used as the color former.

In an embodiment, a montanic acid, a stearyl alcohol, and the like may be used as the lubricant.

In an embodiment, dyes and pigments may be used as the colorant.

In an embodiment, carbon black or the like may be used as the conductive agent or the nucleation agent.

Here, a type and amount of the additives are not particularly limited as long as they do not impair physical properties, particularly transparency, of the prepared polycarbonate copolymer.

In an embodiment, there is no particular limitation on the method of preparing a polycarbonate copolymer composition, and a method of preparing a polycarbonate composition known in the art to which the present invention belongs may be used as it is or modified appropriately, and the above-described resin components and additives may be freely selected and mixed in a desired order without any particular order restriction. For example, each of the above-mentioned resins and additives is melted and extruded in a required amount at a temperature of about 160 to about 270° C. using a single-screw and/or twin-screw extruder to prepare a polycarbonate copolymer composition in a pellet form.

Molded Article

A molded article according to an embodiment of the present invention may be formed from the polycarbonate copolymer; or the composition comprising the polycarbonate copolymer. There is no particular limitation on the method of manufacturing the molded article, and a method known in the art to which the present invention belongs may be used. For example, the molded article may be manufactured by molding the polycarbonate copolymer or the composition comprising the polycarbonate copolymer by a conventional method such as injection molding, extrusion molding, casting molding, blow molding, rotational molding, film molding, and the like.

In an embodiment, the molded article may be formed from the polycarbonate copolymer or the composition comprising the same, and may have excellent heat resistance, scratch resistance, formability, light resistance, weather resistance, transparency, mechanical strength, and the like. Accordingly, the molded article can be used as medical products, daily supplies, food containers, baby products, automobile interior and exterior materials, electronic product exterior materials, optical materials, glass substitute materials, solar energy materials, mobile phone materials, smart watch materials, safety products, industrial materials, 3D printing materials, building materials, cosmetic containers, and the like.

MODE FOR INVENTION

Hereinafter, the present invention will be described in more detail through examples, but these examples are only for the purpose of explanation and should not be construed as limiting the present invention.

EXAMPLES

Example 1

A dihydroxyl compound including 10 mol % of 1,4-butanediol as a primary dihydroxyl compound and 80 mol % of isosorbide and 10 mol % of 2,2-bis(4-hydroxycyclohexyl)propane as secondary dihydroxyl compounds, and 1 mole of diphenyl carbonate as a carbonate diester compound based on 1 mole of the total amount of the dihydroxyl compound were filled in a reactor equipped with an agitator, 500 ppm of $Na_2CO_3$ (based on 1 mole of total dihydroxyl compounds) as a catalyst and 0.1% by weight of triphenyl phosphite as a heat stabilizer were added, then the temperature was raised to 180° C. to melt them, and stirring was performed for 1 hour. Subsequently, a polycarbonate copolymer was prepared by raising the temperature to 200° C. and performing primary polymerization under a reduced pressure of 0.1 bar, increasing the temperature stepwise to 250° C. and further reducing the pressure to 0.0013 bar to perform secondary polymerization. The physical properties of the prepared polycarbonate copolymer specimen were evaluated by the following methods, and the results are shown in Table 1 below.

Example 2

A polycarbonate copolymer was prepared in the same manner as in Example 1, except that 20 mol % of 1,4-butanediol as a primary dihydroxyl compound and 70 mol % of isosorbide and 10 mol % of 2,2-bis(4-hydroxycyclohexyl)propane as secondary dihydroxyl compounds were used. The physical properties of the prepared polycarbonate copolymer specimen were evaluated by the following methods, and the results are shown in Table 1 below.

Example 3

A polycarbonate copolymer was prepared in the same manner as in Example 1, except that 35 mol % of 1,4-butanediol as a primary dihydroxyl compound and 50 mol % of isosorbide and 15 mol % of 2,2-bis(4-hydroxycyclohexyl)propane as secondary dihydroxyl compounds were used. The physical properties of the prepared polycarbonate copolymer specimen were evaluated by the following methods, and the results are shown in Table 1 below.

Comparative Example 1

A polycarbonate copolymer was prepared in the same manner as in Example 1, except that 20 mol % of 1,4-butanediol as a primary dihydroxyl compound and 80 mol % of isosorbide as a secondary dihydroxyl compound were used. The physical properties of the prepared polycarbonate copolymer specimen were evaluated by the following methods, and the results are shown in Table 1 below.

Comparative Example 2

A polycarbonate copolymer was prepared in the same manner as in Example 1, except that a primary dihydroxyl compound was not used and 80 mol % of isosorbide and 20 mol % of 2,2-bis(4-hydroxycyclohexyl)propane were used as secondary dihydroxyl compounds. The physical properties of the prepared polycarbonate copolymer specimen were evaluated by the following methods, and the results are shown in Table 1 below.

Comparative Example 3

A polycarbonate copolymer was prepared in the same manner as in Example 1, except that a primary dihydroxyl compound was not used and 100 mol % of isosorbide as a secondary dihydroxyl compound was used. The physical properties of the prepared polycarbonate copolymer specimen were evaluated by the following methods, and the results are shown in Table 1 below.

Measurement Methods of Physical Properties (1) Evaluation of scratch resistance: A pencil hardness of a specimen was evaluated through a pencil hardness test (ISO 15184).

(2) Glass transition temperature (Tg, unit: ° C.): A glass transition temperature (Tg) was measured at a transition point obtained when, in accordance with ISO 11357, 10 mg of the sample was maintained at 220° C. for 1 minute at a heating rate of 10° C. per minute using a differential scanning calorimeter (DSC) and then cooled at a cooling rate of 10° C. per minute, and the temperature was raised to 220° C. at the same heating rate.

(3) Dynamic viscosity (unit: cps): A dynamic viscosity of a solution in which 0.5 g of the polycarbonate copolymer sample was dissolved in a mixed solvent of 14.5 g of hexafluoroisopropanol and dichloromethane was measured using a Brookfield dynamic viscometer (DV-II+Pro viscometer) at 25° C.

TABLE 1

| Classification | Dihydroxyl compounds (mol %) | | | Pencil hardness | Glass transition temperature (° C.) | Dynamic viscosity (cps) |
| --- | --- | --- | --- | --- | --- | --- |
| | 1,4-butanediol | isosorbide | 2,2-bis(4-hydroxycyclohexyl)propane | | | |
| Example 1 | 10 | 80 | 10 | 3H | 153 | 9.89 |
| Example 2 | 20 | 70 | 10 | 2H | 120 | 9.36 |
| Example 3 | 35 | 50 | 15 | H | 105 | 9.12 |
| Comparative Example 1 | 20 | 80 | 0 | F | 118 | 9.43 |
| Comparative Example 2 | 0 | 80 | 20 | Not measurable | 157 | 9.18 |
| Comparative Example 3 | 0 | 100 | 0 | Not measurable | 160 | 9.36 |

From the above results, it can be seen that polycarbonate copolymers (Examples 1 to 3) of the present invention are multicomponent copolymers obtained by necessarily copolymerizing the primary dihydroxyl compound and at least two secondary dihydroxyl compounds as the dihydroxyl compounds, wherein the polycarbonate copolymer can solve a scratch resistance deterioration problem in the case of using one secondary dihydroxyl compound as in Comparative Example 1, and a brittleness problem (pencil hardness cannot be measured and scratch resistance is reduced) in the case of applying only secondary dihydroxyl compounds as in Comparative Examples 2 and 3, and can improve heat resistance (glass transition temperature) and scratch resistance at the same time. In addition, it was confirmed that the polycarbonate copolymer of the present invention has excellent formability (dynamic viscosity), light resistance, weather resistance, transparency, mechanical strength, and the like.

So far, the present invention has been looked at mainly through examples. Those skilled in the art to which the present invention pertains will be able to understand that the present invention may be implemented in a modified form without departing from the essential characteristics of the present invention. Therefore, the disclosed examples should be considered from an illustrative rather than limiting point of view. The scope of the present invention is shown in the claims rather than the above description, and all differences within the equivalent scope will be construed as being included in the present invention.

The invention claimed is:

1. A polycarbonate copolymer comprising:
   a unit derived from at least one primary dihydroxyl compound; and
   units derived from at least two secondary dihydroxyl compounds,
   wherein the polycarbonate copolymer has a pencil hardness higher than H as measured according to a pencil hardness test (ISO 15184) and a glass transition temperature (Tg) of about 90 to about 160° C. as measured according to ISO 11357.

2. The polycarbonate copolymer of claim 1, wherein the polycarbonate copolymer includes about 1 to about 30 mol % of a unit derived from a secondary dihydroxyl compound represented by Formula 4b based on the units derived from an entire dihydroxyl:

$$HO—R_4—R_5—R_6—OH \quad \text{[Formula 4b]}$$

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

3. The polycarbonate copolymer of claim 1, comprising the following based on the units derived from an entire dihydroxyl:
   about 5 to about 45 mol % of a unit derived from a primary dihydroxyl compound;
   about 45 to about 85 mol % of a unit derived from a secondary dihydroxyl compound represented by Formula 4a; and
   about 1 to about 30 mol % of a unit derived from a secondary dihydroxyl compound represented by Formula 4b:

$$HO—R_7—OH \quad \text{[Formula 4a]}$$

in Formula 4a, $R_7$ is a substituted or unsubstituted cycloalkylene group having 4 to 20 carbon atoms or a substituted or unsubstituted cycloalkoxylene group having 4 to 20 carbon atoms;

$$HO—R_4—R_5—R_6—OH \quad \text{[Formula 4b]}$$

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

4. A polycarbonate copolymer comprising:
about 5 to about 95 mol % of at least one first repeating unit represented by Formula 1 below; and
about 5 to about 95 mol % of at least two second repeating units represented by Formula 2 below:

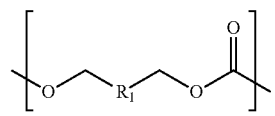

[Formula 1]

in Formula 1, $R_1$ is a single bond, a substituted or unsubstituted alkylene group having 1 to 20 carbon atoms, a substituted or unsubstituted alkoxylene group having 2 to 20 carbon atoms, a substituted or unsubstituted cycloalkylene group having 4 to 20 carbon atoms, or a substituted or unsubstituted cycloalkoxylene group having 4 to 20 carbon atoms;

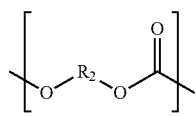

[Formula 2]

in Formula 2, $R_2$ is a substituted or unsubstituted cycloalkylene group having 4 to 20 carbon atoms or a substituted or unsubstituted cycloalkoxylene group having 4 to 20 carbon atoms.

5. The polycarbonate copolymer of claim 4, comprising:
about 5 to about 45 mol % of the first repeating unit;
about 45 to about 85 mol % of a second repeating unit represented by Formula 2a below; and
about 1 to about 30 mol % of a second repeating unit represented by Formula 2b below:

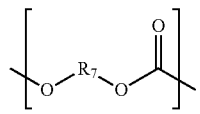

[Formula 2a]

in Formula 2a, $R_7$ is a substituted or unsubstituted cycloalkylene group having 4 to 20 carbon atoms or a substituted or unsubstituted cycloalkoxylene group having 4 to 20 carbon atoms;

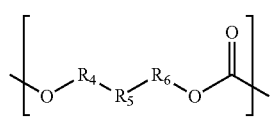

[Formula 2b]

in Formula 2b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

6. The polycarbonate copolymer of claim 4, wherein the first repeating unit is derived from a primary dihydroxyl compound including one or more of ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, 1,2-cyclohexanedimethanol, 1,3-cyclohexanedimethanol, 1,4-cyclohexanedimethanol, tricyclodecane dimethanol, pentacyclopentadecane dimethanol, decalindimethanol, tricyclotetradecane dimethanol, norbornandimethanol, adamantane dimethanol, 3,9-bis(1,1-dimethyl-2-hydroxyethyl)-2,4,8,10-tetraoxaspiro[5.5]undecane, and bicyclo[2.2.2]octane-2,3-dimethanol, and at least one carbonate diester compound.

7. The polycarbonate copolymer of claim 4, wherein the second repeating unit is derived from a secondary dihydroxyl compound including two or more of 1,4:3,6-dianhydrohexitol, 1,2-cyclohexanediol, 1,3-cyclohexanediol, 1,4-cyclohexanediol, 2-methyl-1,4-cyclohexanediol, tricyclodecanediol, pentacyclopentadecanediol, decalindiol, tricyclotetradecanediol, norbonanediol, adamantanediol, 2,2-bis(4-hydroxycyclohexyl)propane, and 2,2,4,4-tetramethyl-1,3-cyclobutanediol, and at least one carbonate diester compound.

8. The polycarbonate copolymer of claim 4, further comprising a third repeating unit derived from at least one tertiary dihydroxyl compound and at least one carbonate diester compound.

9. The polycarbonate copolymer of claim 4,
wherein the polycarbonate copolymer has a pencil hardness higher than H as measured according to a pencil hardness test (ISO 15184); and
the polycarbonate copolymer has a glass transition temperature (Tg) of about 90 to about 160° C. at a transition point obtained when, in accordance with ISO 11357, 10 mg of a sample is maintained at 220° C. for 1 minute at a heating rate of 10° C. per minute and then cooled at a cooling rate of 10° C. per minute, and the temperature is raised to 220° C. at the same heating rate.

10. The polycarbonate copolymer of claim 4, wherein a solution in which 0.5 g of a sample is dissolved in a mixed solvent of 14.5 g of hexafluoroisopropanol and dichloromethane has a dynamic viscosity of about 8.5 to about 16 cps as measured using a Brookfield dynamic viscometer at 25° C.

11. A method of preparing a polycarbonate copolymer, comprising:
melting a dihydroxyl compound including about 5 to about 95 mol % of at least one primary dihydroxyl compound represented by Formula 3 below and about 5 to about 95 mol % of at least two secondary dihydroxyl compounds represented by Formula 4 below, and at least one carbonate diester compound to obtain a melt; and
performing polycondensation of the melt in the presence of a catalyst:

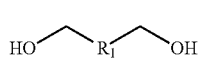

[Formula 3]

in Formula 3, $R_1$ is a single bond, a substituted or unsubstituted alkylene group having 1 to 20 carbon atoms, a substituted or unsubstituted alkoxylene group having 2 to 20 carbon atoms, a substituted or unsubstituted cycloalkylene group having 4 to 20 carbon atoms, or a substituted or unsubstituted cycloalkoxylene group having 4 to 20 carbon atoms;

$$HO-R_2-OH \quad \text{[Formula 4]}$$

in Formula 4, $R_2$ is a substituted or unsubstituted cycloalkylene group having 4 to 20 carbon atoms or a substituted or unsubstituted cycloalkoxylene group having 4 to 20 carbon atoms.

12. The method of claim 11, wherein the dihydroxyl compound includes:
 about 5 to about 45 mol % of the primary dihydroxyl compound;
 about 45 to about 85 mol % of a secondary dihydroxyl compound represented by Formula 4a; and
 about 1 to about 30 mol % of a secondary dihydroxyl compound represented by Formula 4b:

$$HO-R_7-OH \quad \text{[Formula 4a]}$$

in Formula 4a, $R_7$ is a substituted or unsubstituted cycloalkylene group having 4 to 20 carbon atoms or a substituted or unsubstituted cycloalkoxylene group having 4 to 20 carbon atoms;

$$HO-R_4-R_5-R_6-OH \quad \text{[Formula 4b]}$$

in Formula 4b, $R_4$ and $R_6$ are each independently a cycloalkylene group or a cycloalkoxylene group having 4 to 10 carbon atoms, and $R_5$ is a linear or branched alkylene group having 1 to 10 carbon atoms.

13. The method of claim 11, wherein the dihydroxyl compound further includes at least one tertiary dihydroxyl compound, and the tertiary dihydroxyl compound includes one or more of 1,1'-bis(4-hydroxyphenyl)-3,3,5-trimethyl-cyclohexane, bis(4-hydroxyphenyl)cyclohexane, and bis(4-hydroxyphenyl)cyclopentane.

14. The method of claim 11, wherein the carbonate diester compound includes one or more of diphenyl carbonate, ditolyl carbonate, dimethyl carbonate, diethyl carbonate, and di-t-butyl carbonate.

15. A composition comprising the polycarbonate copolymer according to claim 1.

16. A composition comprising the polycarbonate copolymer according to claim 4.

* * * * *